April 1, 1952  M. A. BECK  2,591,228
RUST REMOVER FOR COOLING SYSTEMS
OF AUTOMOBILE ENGINES
Filed Aug. 10, 1949
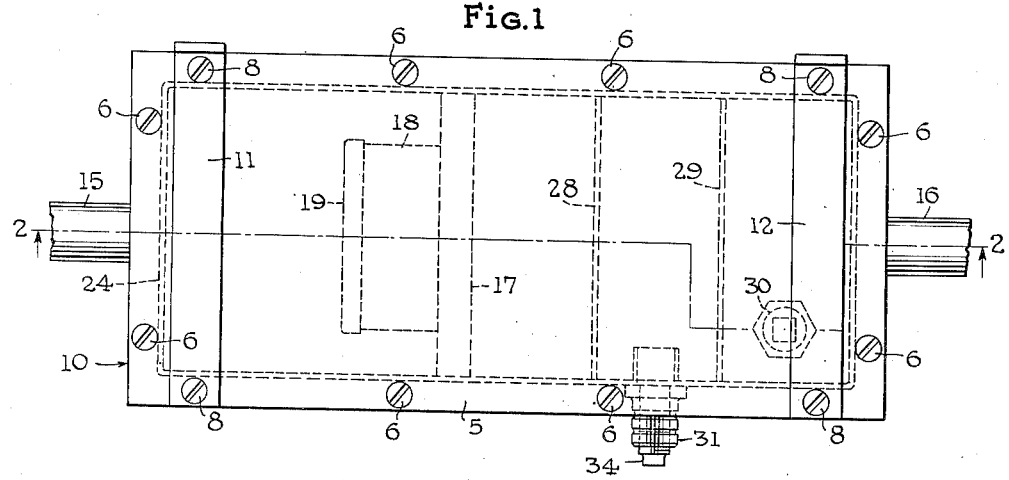
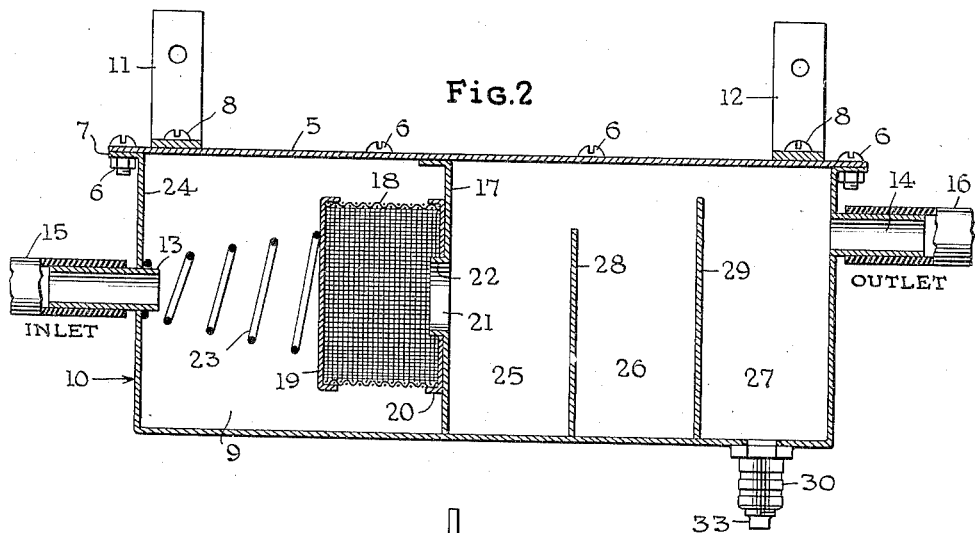
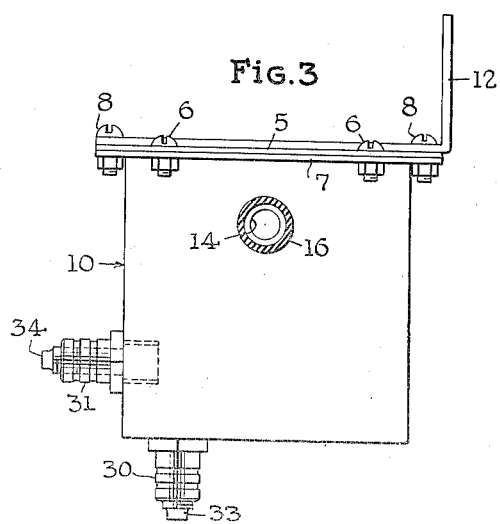
Inventor
Martin A. Beck
By
Raphaël Semmes
Attorney Patented Apr. 1, 1952

2,591,228

UNITED STATES PATENT OFFICE 2,591,228

RUST REMOVER FOR COOLING SYSTEMS OF AUTOMOBILE ENGINES

Martin A. Beck, York, Pa.

Application August 10, 1949, Serial No. 109,567

4 Claims. (Cl. 241—39)

My invention relates to improvements in filtering devices and is especially directed to a simple, readily installed attachment for an automobile radiator which is adapted to remove loose foreign matter from the circulating water in the cooling system of an automobile engine.

In the operation of an automobile engine, the cooling water invariably becomes contaminated with loose suspended material such as rust, scale and other particles of foreign matter. The presence of these materials in the circulating water is injurious to the engine and highly detrimental to its efficient functioning. This is so because the loose particles accumulate in the narrow passages in the radiator thus preventing the free circulation of the water. Further, the loose particles of dirt deposit on the walls of the radiator and of the engine block forming a thermally insulating layer which seriously interferes with, and minimizes the cooling action of the circulating water. By reason of the insufficient cooling action, the engine overheats, eventually leading to a seizing of the pistons and sticking of the valves necessitating a complete and expensive overhaul of the engine.

It is the object of my invention to overcome these difficulties in the operation and maintenance of such cooling systems by providing a simple, inexpensive rust trap, which effectively removes all foreign matter from the circulating water, thus insuring the efficient functioning of the engine. The operation of my device does not entail the use of chemicals and thereby avoids the introduction of corrosive materials into the cooling system. In accordance with my invention, the sludge, rust and other particles in the circulating water are first broken up by the operation of a stationary member which forms an integral part of my trap and the resultant suspended material is removed from the cooling water in a plurality of sedimentation compartments as the water continues to flow through the trap. Provision is made for the ready removal of the sediment from the trap when necessary.

Other objects and advantages of my invention will become apparent from the following description of my device taken in connection with the drawings in which:

Figure 1 is a top plan view of my improved rust trap;

Figure 2 is a vertical longitudinal section along line 2—2 of Figure 1, together with connections for attachment to a liquid cooling system of an engine, while Figure 3 is an end view.

While my device may be used to remove rust, scale and dirt from any flowing liquid stream, it will be particularly described with reference to its application to the cleaning of the circulating, cooling water of an automobile engine which, as usual, is provided with a pump for effecting the circulation of the water. The device is then interposed between the radiator and the cooling jacket of the engine. Referring to the drawings, 10 designates my improved pulverizing rust trap in its entirety; it is supported by two right-angled brackets 11, 12 on the engine side of the dashboard, underneath the hood.

The trap chamber is rectangular in shape and is made of brass or any other suitable non-corrosive material. It is provided with a removable cover 5 which is secured by nut and bolt fastenings 6, 6 to flanges 7 integral with the side walls of the trap chamber, a suitable sealing gasket (not shown) being positioned between the cover and the flanges to form a tight seal for the chamber 10. The aforementioned mounting brackets 11, 12 are secured to the cover and flanges by means of bolt and nut fastenings 8, 8. The trap is provided with an inlet fitting 13 and an outlet fitting 14. A hose connection 15 detachably connects the inlet 13 to the water outlet on the top of the motor block (not shown), while the hose connection 16 detachably connects the outlet 14 to the suction inlet of the usual water circulating pump. In this latter line, there may also be interposed a conventional car heater.

Inside the chamber 10 and adjacent the inlet end thereof, there is disposed a vertical partition wall 17 forming with the walls of the chamber a closed disintegrating compartment 9 in which is mounted a disintegrating means for the agglomerated matter suspended in the circulating water. In the preferred embodiment of my invention, the disintegrating means consists of a hollow member having perforated walls, said member preferably being in the form of a cylindrical screen 18 which is closed at one end by a close fitting flanged disc 19 and, at its other end, the screen is provided with an apertured flanged disc 20, the opening in the latter being aligned with a central opening 21 in the partition 17. By reference to Figure 2, it will be observed that the central portion of the partition 17 is flanged outwards at 22 forming a support and guide for the end member 20 of the screen. A spring 23 engages the end wall 24 of the trap and, also, the closed end 19 of the screen, thus serving to maintain the latter in centered position against the partition 17, the screen being supported by said partition and projects into the compartment 9 towards the inlet 13. The compartment 9 of the trap chamber between the end wall 24 and partition 17 constitutes a disintegrating or pulverizing compartment wherein the agglomerated matter suspended in the circulating water is effectively broken up. The stream of water delivered under pressure by the usual circulating pump is dashed around in the disintegrating compartment against the screen 18 until all the agglomerated rust, scale, dirt, etc. is broken up and pulverized fine enough to pass through the perforations in the screen which, of course, are chosen of a size suitable to this end. As will be observed, the disintegrating means are so constructed and arranged that all of the liquid flowing from the inlet of the trap chamber 10 to the outlet thereof, must pass through the disintegrating compartment 9, and the disintegrating means or screen 18, thus insuring that all the agglomerated suspended matter in the liquid is properly reduced in size before it leaves the disintegrating or pulverizing compartment.

The liquid, carrying in suspension the disintegrated material, leaves the disintegrating compartment through the opening 21 in the partition 17 and enters into the remaining portion of the trap chamber 10. This portion of the chamber is formed into a series of settling compartments 25, 26, 27 for the suspended matter by the provision of baffle means 28, 29. These baffles, the number of which may vary as desired, are disposed between the disintegrating compartment and the outlet 14, and are of progressively increasing height in the direction of the liquid flow, as illustrated in Figure 2 of the drawings. The liquid emerges from the compartment 9 through the restricted opening 21 in the partition 17, and enters into the relatively enlarged compartment 25. Consequently, its velocity is materially decreased and, as a result, as it continues to flow toward the outlet 14 of the trap chamber, the matter suspended in the liquid settles out gradually in the bottom of the compartment 25 and similarly in compartments 26 and 27.

The final result is, that the liquid leaving the trap at 14, for circulation through the radiator and cooling jacket of the engine is substantially free of suspended material. The amount of material which fails to settle out in the compartments 25, 26, 27 is negligible and is of such a character—i. e. so finely divided—that the possibility of its lodging and obstructing the passages in the radiator or in the cooling jackets is vastly reduced. The consequence is that the cooling action of the liquid is greatly improved and the circulation of the liquid through the system is not obstructed.

In order to be able, when necessary, to clean out the settling compartments of accumulated deposits the trap is provided with a drain 30 in the bottom of compartment 27, and a hose connection 31 on the side wall of the chamber 10 at the compartment 26, both of which are normally closed by suitable plugs 33 and 34 respectively (see Fig. 3). When it is desired to flush out the trap of deposits, the trap is disconnected from its hose connections and the inlet 13 is closed in any suitable manner. The plug is removed from the fitting 31 which is then connected by means of a hose to a supply of water under pressure; the pressure of the ordinary "city" water supply is usually adequate for this purpose. The water streaming in through the connection 31 dislodges the dirt deposits on the bottom of the settling chambers and flushes the same out through the outlet 14. To complete the cleaning operation the plug 34 is replaced and the supply of water is directed through the entire chamber by introducing the same through the inlet 13 and allowing it to discharge through outlet 14. The drain plug 33 may, of course, be used when necessary for draining the bottom of the trap chamber.

It will be apparent from the foregoing description, that I have provided a simple, inexpensive and effective device which is foolproof; it does not have parts which wear out or have to be replaced. The screen in the pulverizing compartment cannot clog because, the pressure of the inrushing water washes the screen constantly free of any matter accumulated thereon which, as explained above, is eventually pulverized and passed out through the screen into the settling compartments. Because the liquid flows from the region exterior to the screen toward the interior thereof, those particles which are too large to pass through the mesh or perforations of the screen remain in the disintegrating compartment rather than accumulating within the interior of the screen and clogging the latter. Moreover, the operation of the device does not in any manner interfere with the operation of the cooling system.

As will be appreciated, my improved rust trap can be installed on vehicles already in use, or form a standard part of circulating cooling systems of engines as originally constructed.

I claim:

1. A device of the class described for removing suspended material particles from a flowing liquid stream, said device comprising a closed chamber, a partition wall extending through the interior of said chamber so as to form a closed disintegrating compartment therein, an inlet means communicating with said disintegrating compartment, said partition wall having an opening therethrough, a hollow member within said disintegrating compartment and having perforated walls and an open end, means mounting said hollow member open end to said partition wall in sealed communication with said opening, said hollow member projecting inwardly from said partition wall toward the interior of said disintegrating compartment, whereby said liquid stream may flow from the exterior of said hollow member through the perforated walls thereof to the interior of the hollow member and then through said partition wall opening, and any suspended material particles too large to pass through said perforated walls will be retained in the disintegrating compartment, said inlet means supplying liquid at a rate to agitate and disintegrate said particles, and baffle means in said chamber and projecting upwardly from the bottom thereof and disposed exterior to the said disintegrating compartment to provide settling compartments.

2. A device according to claim 1 wherein said chamber extends horizontally, said inlet means and said disintegrating compartment being located at one end of said chamber, the latter having an outlet means at the other end thereof, said baffle means being located between said partition wall and the outlet means, said partition wall and said baffle means extending vertically and transversely of the horizontal chamber, whereby the liquid flow through said chamber is in a generally horizontal path so as to increase the tendency of the disintegrated particles to settle in said settling compartments.

3. A device according to claim 1 and having resilient means abutting against the end of said hollow member opposite said open end and urging said member toward the partition wall so as to retain said member in mounted position on said wall.

4. A device according to claim 1 wherein said hollow member is in the form of a cylindrical screen having an apertured disc at said open end, said partition wall being provided with a flange projecting inwardly toward the interior of said disintegrating compartment and surrounding said opening in said partition wall, said apertured disc receiving said flange and being mounted thereon.

MARTIN A. BECK.

REFERENCES CITED

The following references are of record in the file of this patent:

UNITED STATES PATENTS

| Number | Name | Date |
|---|---|---|
| 968,242 | Inman | Aug. 23, 1910 |
| 1,290,820 | Winkel | Jan. 7, 1919 |
| 1,468,906 | Inman | Sept. 25, 1923 |
| 1,630,504 | Walker | May 31, 1927 |
| 1,635,007 | Orem | July 5, 1927 |
| 1,804,743 | Cannon | May 12, 1931 |
| 1,875,531 | Walton | Sept. 6, 1932 |
| 1,918,006 | Walton | July 11, 1933 |
| 2,175,563 | Green | Oct. 10, 1939 |
| 2,314,573 | Clark et al. | Mar. 23, 1943 |